(12) United States Patent
Gottlieb

(10) Patent No.: US 6,533,461 B2
(45) Date of Patent: Mar. 18, 2003

(54) ANTI-REVERSAL AND ANTI-ROTATION THRUST WASHER

(75) Inventor: Russell B. Gottlieb, Canton, CT (US)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/929,452

(22) Filed: Aug. 14, 2001

(65) Prior Publication Data

US 2003/0035604 A1 Feb. 20, 2003

(51) Int. Cl.⁷ ................................ F16C 17/04
(52) U.S. Cl. ....................... 384/420; 384/255
(58) Field of Search ................ 384/420, 255, 384/424, 425, 426

(56) References Cited

U.S. PATENT DOCUMENTS

| | | |
|---|---|---|
| 4,915,512 A | 4/1990 | Hilby et al. |
| 5,007,746 A | 4/1991 | Matzelle et al. |
| 5,413,418 A | 5/1995 | Lee |
| 5,846,001 A | 12/1998 | Muntnich et al. |
| 5,918,987 A | 7/1999 | Sundquist et al. |
| 5,927,870 A | 7/1999 | Kranz et al. |
| 5,967,673 A | 10/1999 | Kenney, Jr. et al. |
| 5,967,674 A | 10/1999 | Reubelt et al. |

Primary Examiner—Lenard A. Footland
(74) Attorney, Agent, or Firm—Michael & Best Friedrich LLP

(57) ABSTRACT

A thrust washer formed from metal sheet has a flat, ring-shaped thrust portion oriented radially, and at least one tab extending from an outer or inner perimeter of the thrust portion. The tab includes a radially oriented mid-portion and at least one wing-portion extending perpendicular to the mid-portion and parallel to the axis of the thrust portion such that a flat surface of the wing-portion can engage a recess of a backup member to prevent rotation of the thrust washer relative to the backup member. The tab is not symmetrical about a line along a diameter of the thrust portion.

6 Claims, 2 Drawing Sheets

US 6,533,461 B2

ANTI-REVERSAL AND ANTI-ROTATION THRUST WASHER

BACKGROUND OF THE INVENTION

This invention relates generally to thrust bearings with rollers and, more particularly, to a thrust washer having anti-reversal and anti-rotation features for use in such thrust bearings.

Thrust bearings with rollers are intended to transmit thrust through the rolling elements, typically rolling on raceways of two opposed thrust washers, without sliding of the thrust washers along their respective backup surfaces. Such sliding may be a problem, particularly when a backup surface is made of a material that is softer than the preferred hardened steel, such as unhardened steel, aluminum or even plastic, for example. In such applications, a simple tab extending radially outwardly from the thrust washer would cut into the backup material rather than prevent relative rotation.

Generally, the two thrust washers of such thrust bearings are not identical, and many applications require such thrust bearings to be installed with a particular one of the two thrust washers against a respective mating surface. That is, assembly of the transmission or other device requires installation of the thrust bearing assembly in a particular orientation, or, in other words, not "backwards". Accordingly, there is a need for a thrust washer with both an anti-rotation device and an anti-reversal device suitable for use with relatively soft backup materials.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a thrust washer formed from metal sheet and comprising a flat, ring-shaped thrust portion oriented radially with respect to an axis and including a raceway for rollers, and at least one tab extending from an outer or inner perimeter of the thrust washer. The tab includes a radially oriented mid-portion and at least one wing-portion extending perpendicular to the mid-portion and parallel to the axis of the thrust portion such that a flat surface of the wing-portion may engage a recess of a backup member to prevent rotation of the thrust washer relative to the backup member. The tab is not symmetrical about a line along a diameter of the thrust portion but is "offset" therefrom.

The foregoing and other aspects will become apparent from the following detailed description of the invention when considered in conjunction with the accompanying drawing figures.

BRIEF DESCRIPTION OF THE DRAWING FIGS

DETAILED DESCRIPTION

Figure 1:
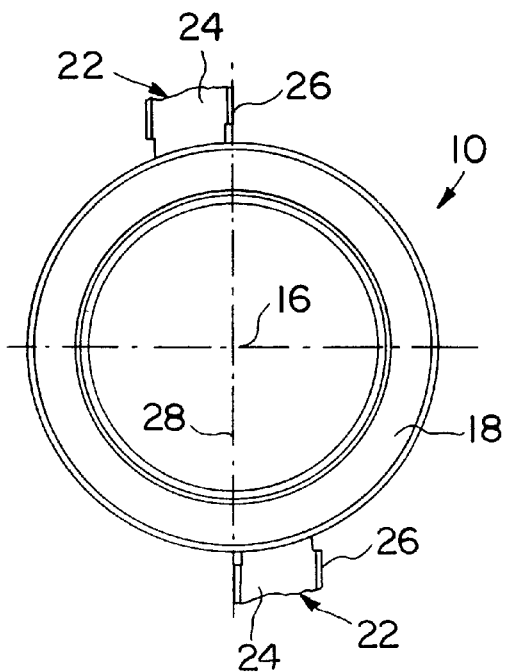
FIG. 1 is an axial view of the front of a thrust bearing illustrating a first embodiment of the present invention.
Figure 2:
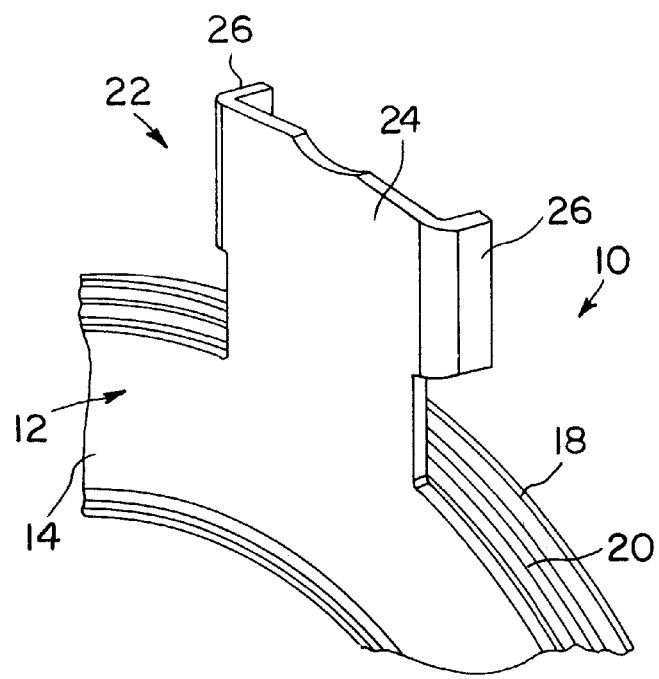
FIG. 2 is an enlarged pictorial view of a portion of the thrust bearing of FIG. 1, as seen from the back and side.

Referring now to the drawings, FIGS. 1 and 2 illustrate a thrust bearing 10 with a thrust washer 12 formed from sheet metal according to the present invention. A flat, ring-shaped thrust portion 14 is oriented radially, that is, oriented perpendicular with respect to axis 16 of the thrust portion 14. As indicated in FIG. 2, thrust bearing 10 may include a second thrust washer 18 and a cage 20 holding rollers, not shown, between raceways of thrust washer 12 and second thrust washer 18.

In the embodiment of FIGS. 1 and 2, at least one tab 22 extends radially outwardly from an outer perimeter of thrust washer 12. A radially oriented mid-portion 24 of tab 22 lies in a plane parallel to the plane of thrust portion 14, and at least one wing-portion 26 extends perpendicular to the mid-portion 24 and parallel to the axis 16. Thus, the wing-portion 26 can present a flat, smooth surface to a recess of a backup member, not shown, to prevent rotation of the thrust washer 12 relative to the backup member. The present invention also includes a similar configuration, not shown, with at least one tab extending from an inner periphery of thrust washer 12.

Significantly, tab (or tabs) 22 is (or are) located asymmetrically with respect to line 28 along a diameter of thrust portion 12. Because of this "offset" from line 28, assembly of thrust bearing 10 into a transmission or other device requires installation of the thrust bearing in a particular orientation, or, in other words, not "backwards". If the thrust bearing were presented to the backup surface with a "backwards" orientation, the tab (or tabs) 22 would not seat within the recess of the backup surface designed to receive the tab 22.

The outer perimeter of thrust washer 12 may include a circumferential lip between thrust bearing 14 and tab 22, the circumferential lip being directed axially from an outer or inner perimeter of thrust surface 14. Two examples of such embodiments are illustrated in FIGS. 3 through 6.

Figure 3:
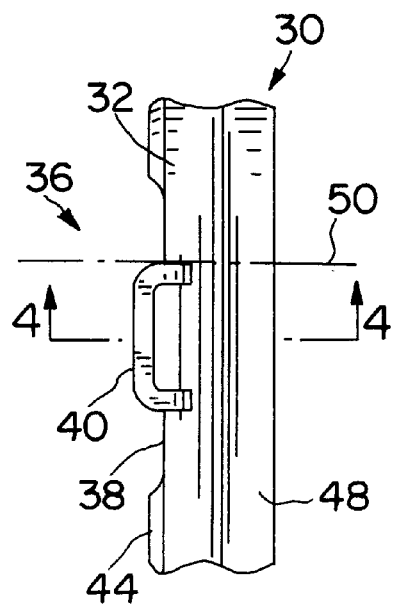
FIG. 3 is a top view of a portion of a thrust washer illustrating a second embodiment of the present invention.
Figure 4:
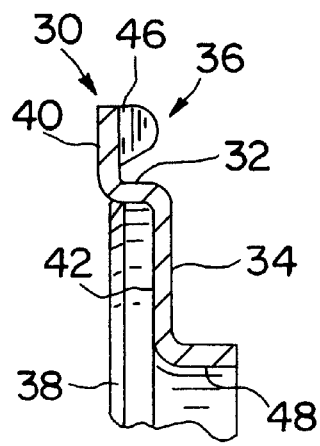
FIG. 4 is a sectional view along the line 4—4 of FIG. 3.

FIGS. 3 and 4 illustrate a thrust washer 30 having an axially directed circumferential lip 32 between thrust portion 34 and tab 36. Circumferential lip 32 includes a relieved portion 38 with a reduced axial length to facilitate forming of tab 36 such that mid-portion 40 has a desired axial offset with respect to thrust surface 42 and unrelieved portion 44 of circumferential lip 32. This embodiment has winged portions 46 and a lip or flange 48 extending radially from an internal perimeter of thrust washer 30, in an axial direction away from circumferential lip 32. Tab 36 is asymmetrical with respect to line 50 along a diameter of thrust portion 34 to provide the desired anti-reversal feature of the invention.

Figure 5:
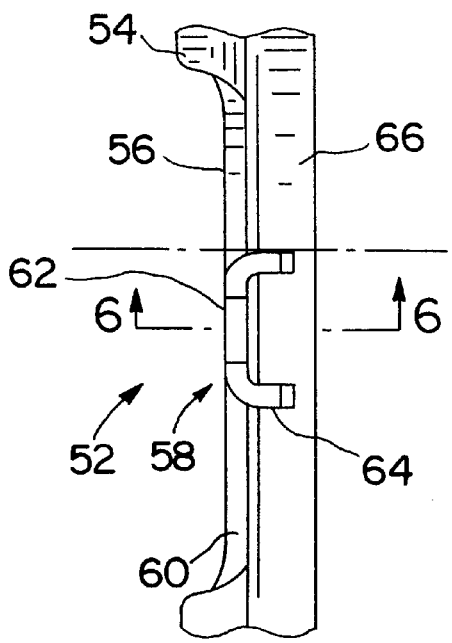
FIG. 5 is a top view of a portion of a thrust washer illustrating a third embodiment of the present invention.
Figure 6:
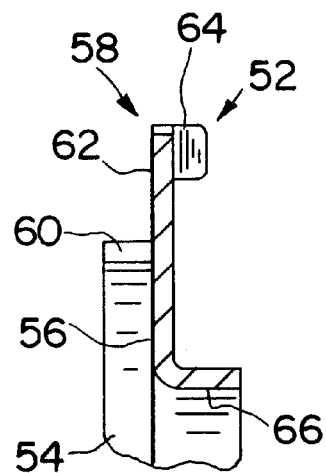
FIG. 6 is a sectional view along the line 6—6 of FIG. 5.

FIGS. 5 and 6 illustrate a thrust washer 52 having axially directed circumferential lip 54 between thrust portion 56 and tab 58. Circumferential lip 54 includes a relieved portion 60 with a reduced axial length to facilitate forming of tab 58 such that mid-portion 62 has no axial offset with respect to thrust surface 56. This embodiment has winged portions 64 and a lip or flange 66 extending radially from an internal perimeter of thrust washer 30, in an axial direction away from circumferential lip 54. Tab 58 is asymmetrical with respect to line 60 long a diameter of thrust portion to provide the desired anti-reversal feature of the invention.

The present invention includes configurations in which the winged portion of the tab extends either axially inwardly (towards the caged rollers and the opposing thrust washer) as illustrated by winged portions 26 of the embodiment of FIGS. 1 and 2, or axially outwardly (away from the caged rollers and the opposing thrust washer).

The thrust washer of the present invention incorporates both anti-rotation and anti-reversal devices that are particularly beneficial when used in applications which utilize a backup surface which is softer than (the preferred) hardened steel. The winged tab of the present invention presents a larger and smoother anti-rotation surface than prior art devices and resists wearing or otherwise damaging of the engaging feature, and the location of the tab provides assurance that the thrust bearing will not be installed "backwards".

Having described the invention, what is claimed is:

1. A thrust washer formed from metal sheet and comprising:
   a flat, ring-shaped thrust portion oriented radially, that is, oriented perpendicular with respect to an axis, and including a raceway for rollers; and
   at least one tab extending from an outer or inner perimeter of the thrust portion, the tab including a radially oriented mid-portion and at least one wing-portion extending perpendicular to the mid-portion and parallel to the axis of the thrust portion such that a flat surface of the wing-portion may engage a recess of a backup member to prevent rotation of the thrust washer relative to the backup member, the tab being asymmetrical about a line along a diameter of the thrust portion such that the tab is "offset" therefrom.

2. A thrust washer according to claim 1, further comprising an axially directed circumferential lip between the thrust portion and the tab, and the mid-portion of the tab and the axial end of the circumferential lip are substantially in the same plane perpendicular to the axis of the thrust washer.

3. A thrust washer according to claim 1, further comprising an axially directed circumferential lip between the thrust portion and the tab, the circumferential lip including a relieved portion having a reduced axial length and an unrelieved portion, and the mid-portion of the tab is recessed axially inwardly with respect to the unrelieved portion of the circumferential lip.

4. A thrust washer according to claim 3, wherein the relief portion extends to the thrust portion and wherein the mid-portion of the tab is in radial alignment with the thrust portion, that is, the mid-portion of the tab and the thrust portion are in the same plane perpendicular to the axis of the thrust washer.

5. A thrust washer according to claim 1, wherein the thrust washer has a thrust surface facing a first axial direction and the winged portion of the tab is directed away from the thrust washer in an opposite axial direction.

6. A thrust washer according to claim 1, wherein the thrust washer has a thrust surface facing a first axial direction and the winged portion of the tab is directed away from the thrust washer in said first axial direction.

* * * * *

UNITED STATES PATENT AND TRADEMARK OFFICE
CERTIFICATE OF CORRECTION

PATENT NO. : 6,533,461 B2
DATED : March 18, 2003
INVENTOR(S) : Russell B. Gottlieb It is certified that error appears in the above-identified patent and that said Letters Patent is hereby corrected as shown below:

Column 2,
Line 62, delete "long" and replace with -- along --.

Signed and Sealed this

Thirteenth Day of May, 2003

JAMES E. ROGAN
*Director of the United States Patent and Trademark Office*